United States Patent
Musschebroeck et al.

(10) Patent No.: US 6,864,778 B2
(45) Date of Patent: Mar. 8, 2005

(54) METHOD OF PREVENTING COLLISION BETWEEN REMOTE CONTROL SIGNALS

(75) Inventors: Rudy Musschebroeck, Leuven (BE); Marc Emiel Celine Lambrechts, Leuven (BE); Johan Agnes Emile Wouters, Leuven (BE); Geert Luk Maria Van Overbeke, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 406 days.

(21) Appl. No.: 09/864,108

(22) Filed: May 24, 2001

(65) Prior Publication Data

US 2002/0003467 A1 Jan. 10, 2002

(30) Foreign Application Priority Data

May 30, 2000 (EP) .............................................. 00201913

(51) Int. Cl.⁷ .............................................. G05B 23/02
(52) U.S. Cl. ................... 340/3.41; 340/825.72
(58) Field of Search .................... 340/3.41, 825.69, 340/825.72, 825.53, 825.5, 825.52, 2.4, 825.25; 370/498, 470, 349; 398/92; 455/41.2, 67.11, 13; 345/156, 161; 463/37, 39, 58; 375/369; 710/9; 725/37

(56) References Cited

U.S. PATENT DOCUMENTS

| | | | | |
|---|---|---|---|---|
| 5,227,775 A | * | 7/1993 | Bruckert et al. | 340/825.25 |
| 5,331,450 A | * | 7/1994 | Heep et al. | 398/92 |
| 5,663,716 A | | 9/1997 | Miwa et al. | 340/825.04 |
| 5,881,366 A | * | 3/1999 | Bodenmann et al. | 455/41.2 |

* cited by examiner

*Primary Examiner*—Michael Horabik
*Assistant Examiner*—William Bangachon
(74) *Attorney, Agent, or Firm*—Edward W. Goodman

(57) ABSTRACT

The invention relates to a system including an apparatus and a plurality of remote controls. Each remote control is equipped with a detector for detecting infrared signals from the other remote controls. The remote controls are capable of controlling the transmission of messages in dependence on a detection of signals from the other remote controls. In this way, collision between signals from different remote controls is prevented.

17 Claims, 3 Drawing Sheets

METHOD OF PREVENTING COLLISION BETWEEN REMOTE CONTROL SIGNALS

BACKGROUND OF THE INVENTION

1. Field of the Invention

The invention relates to a system comprising an apparatus and at least one remote control, said remote control comprising a transmitter for transmitting control data to the apparatus and collision preventing means for preventing collision between said control data and further control data transmitted by a further remote control.

The invention also relates to a remote control for use in the above system.

The invention also relates to a method of transmitting control data from a remote control to an apparatus, comprising a step of preventing collision between said control data and further control data transmitted by a further remote control.

2. Description of the Related Art

Recently there has been an increasing demand for simultaneous use of two or more remote controls to control a single apparatus. For example, multiple remote controls may be used for controlling a multi-player game, or for allowing multiple viewers of an interactive TV show to key in answers to questions and compare the results and reaction times. In such situations, it will often occur that two users operate their remote control at the same time, causing collision between signals transmitted from the respective remote controls.

An example of a system of the type defined in the opening paragraph is known from U.S. Pat. No. 5,663,716. The known system comprises an apparatus and a plurality of remote controls for controlling said apparatus. Collision between signals of the remote controls is avoided by transmitting each message multiple times, separated by pauses which are longer than the message time itself. Using this scheme, it can be guaranteed that at least one copy of the data will be received by the apparatus without having any interference with messages originating from other remote controls.

A disadvantage of the known system is that the repeated transmission of each message is inefficient in terms of time and power consumption. Each transmission consumes battery power, which is an important drawback, particularly for (wireless) remote controls. Furthermore, each transmission takes a certain time, which could have been used for transmitting another message from the same or another remote control. Especially in highly interactive applications, such as action games, this is a severe drawback.

SUMMARY OF THE INVENTION

It is an object of the invention to provide an improved system and method of the type defined in the opening paragraph. To that end, the system according to the invention is characterized in that the remote control comprises detection means for detecting said further control data, the collision preventing means being adapted to control the transmission of the control data in dependence on a detection by the detection means of the further control data. In this way it, is achieved that each remote control is capable of detecting transmissions by other remote controls and controlling its own transmission behavior to avoid collision with such transmissions. For example, if the remote controls make use of infrared (IR) signals, the detection means are capable of detecting direct, dispersed or reflected IR signals originating from another remote control. Dispersed or reflected IR signals may be weaker than direct signals, but it is not necessary to correctly receive and decode such signals. It suffices to detect the presence of the signals. Instead of IR signals, the remote controls may use radio frequency (RF) or ultrasound signals, which may be detected in a similar way. Since the remote controls according to the invention can actually sense the transmission medium for transmissions by other remote controls, there is no need to transmit each message multiple times for guaranteeing that it will be received correctly. The disadvantages of the known system are thus overcome. Preferably, each remote control of the system according to the invention is equipped with such detection means. However, this is not absolutely necessary. For example, a system originally purchased with a single conventional remote control may be extended with a remote control according to the invention. The latter remote control will control its own transmission behavior to avoid collision with signals transmitted by the conventional remote control. The remote control according to the invention may be a universal or learnable remote control, in which case it may be set or taught to recognize and detect signals from the other remote control.

An embodiment of the system according to the invention is characterized in that the collision preventing means are adapted to delay transmission of the control data until no further control data have been detected for a predetermined delay period. The remote control according to the invention thus senses the transmission medium before transmitting its own message. The medium can only be considered free if a certain time, typically called the Signal Free Time (SFT), has elapsed. If no further control data have been detected during the SFT, the message can be transmitted.

An embodiment of the system according to the invention is characterized in that the collision preventing means are adapted to extend the delay period by a random period of time. In case different remote controls attempt to send at the same time or have been waiting for the medium to become free after a transmission of any other remote control, a collision is inevitable. To reduce the chance that this event occurs, a random wait time is introduced. The time for which the medium has to be free before a remote control starts a transmission is incremented by a random time. The remote control with the longest additional delay will hence "see" that the other remote control has already started sending and will have to wait once more for the medium to become free. The reduction of the chance of having a collision depends on the number of different possible random times.

An embodiment of the system according to the invention is characterized in that the remote control comprises priority means for assigning a priority to the remote control relative to further remote controls, the collision preventing means being adapted to extend the delay period by a period of time whose length is dependent on said priority. Remote controls with a relatively high priority thus have a relatively short delay period, which assures that their messages are transmitted earlier than messages of remote controls with a relatively low priority.

An embodiment of the system according to the invention is characterized in that the priority means are adapted to lower the priority relative to the further remote controls after a transmission. The system according to the present embodiment thus uses dynamic priorities, i.e., a remote control sets it own priority to the lowest level after a successful transmission. Conversely, the remote control may increase its priority after an unsuccessful attempt.

An embodiment of the system according to the invention is characterized in that the collision preventing means are adapted to retransmit the control data if the further control data are detected within a predetermined period of time after a first transmission of the control data. Despite the application of the detection means, a collision may still occur if two or more messages were transmitted exactly at the same time, or if the system comprises one or more conventional remote controls which do not sense the medium before transmitting their own messages. In the present embodiment, the remote control checks the medium immediately after transmitting a message. When the medium appears not to be free, a collision has occurred, and the remote control has to make a new attempt to transmit its message.

An embodiment of the system according to the invention is characterized in that the transmission of the control data involves on-off keying, the detection means being adapted to detect the further control data during 'off' periods, the collision preventing means being adapted to abort the transmission of the control data upon such detection of the further control data, and to retransmit the control data at a later instant. If a remote control protocol is based on On-Off Keying (OOK), detection of signals from other remote controls during the "off" periods is possible, because then the detection means cannot be triggered by signals transmitted from the remote control itself. Again, each remote control is forced to respect the Signal Free Time, but then all devices are allowed to send immediately. While sending they nevertheless need to check whether IR activity in the medium is in accordance with what they have sent. This means that the device has to sense the medium for activity during the "off" periods in its own message. As soon as a device senses that the medium is occupied during its own off time, the device knows that another remote control is sending as well, and aborts its transmission. This approach guarantees that when a collision occurs between two messages, one of the two messages is transmitted correctly.

Throughout this specification the term "remote control" is to be interpreted broadly to include all types of devices for remotely controlling or sending messages to an apparatus, e.g., game controllers in combination with a set-top box or a computing device, such as, a PC and a game console, a remote control device for controlling a TV or audio set, or any input device for remotely inputting data to a data processing apparatus, e.g., a wireless keyboard.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF THE PREFERRED EMBODIMENTS

Figure 1:
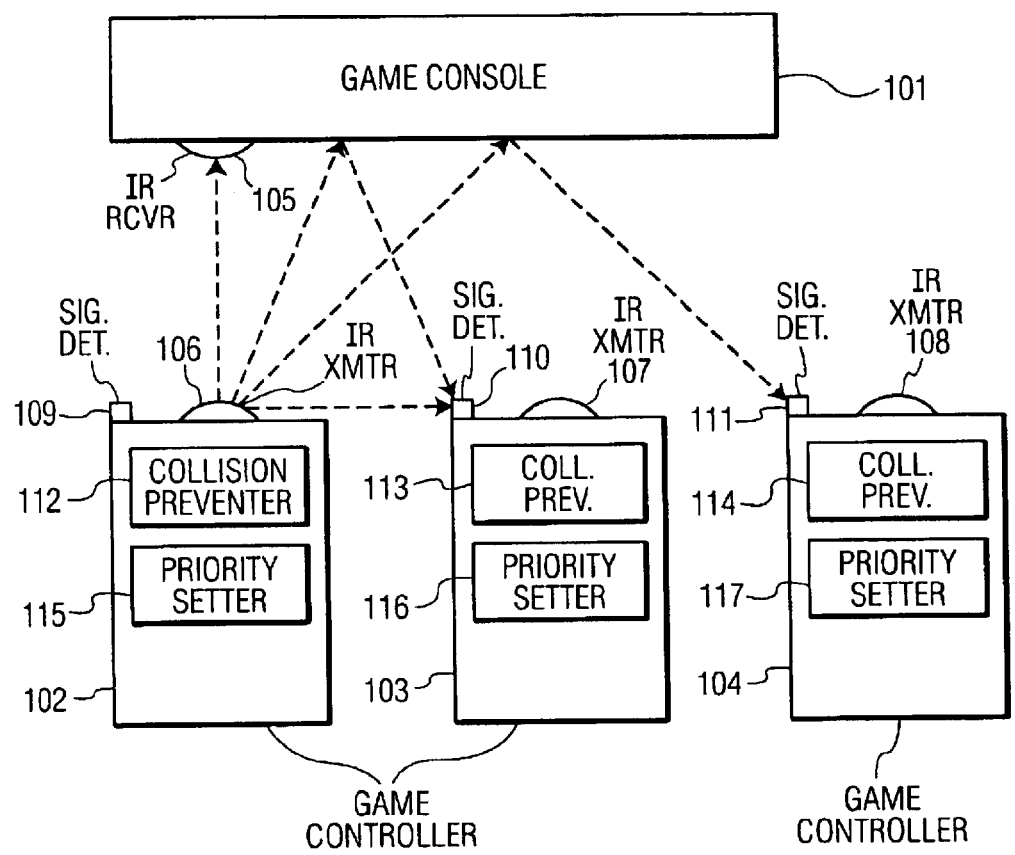
FIG. 1 shows a diagram of a game console and three game controllers as an embodiment of the system according to the invention.

FIG. 1 shows a diagram of a game console 101 and three game controllers 102, 103 and 104 as an embodiment of the system according to the invention. The game console 101 comprises an infrared (IR) receiver 105 for receiving IR control data from IR transmitters 106, 107 and 108 of game controllers 102, 103 and 104, respectively. The game console 101 further comprises a processing unit for running game software, storage means for storing the software and temporary data, and a display screen for displaying graphical images. These components are not shown as they are basically conventional and do not contribute to the present invention. The IR receiver 105 is also conventional, in that it is limited to the detection of valid commands, which is conceptually identical to the operation of a normal remote control receiver. In an alternative embodiment, the console 101 is only a base unit connected, via a link, to a central computing system at a remote location. The function of preventing collision between IR signals is entirely performed by the game controllers 102, 103 and 104. The game controller 102 further comprises detection means 109, collision preventing means 112 and priority means 115. The game controller 103 similarly comprises detection means 110, collisions preventing means 113 and priority means 116, and the game controller 104 comprises detection means 111, collision preventing means 114 and priority means 117. Furthermore, the game controllers 102, 103 and 104 comprise buttons (not shown) allowing a user to enter commands, which are then converted into IR control data and transmitted through the respective IR transmitters 106, 107 and 108. Alternatively or additionally, input means, such as, a graphical touch screen, an FSR (force sensitive resistor), a joystick, a tilt sensor, or a Hall sensor, may be provided for the same purpose. Each of the detection means 109, 110 and 111 is capable of detecting signals which originate from another game controller, either directly or indirectly through reflection (against the console 101, walls, furniture etc.), as depicted in FIG. 1. In this way, it is achieved that each game controller can sense IR activity by other game controllers in the system. If the user presses buttons of the game controller 103, the proper IR signals are generated and prepared for transmission. However, before such transmission, the collision preventing means 113 check whether the detection means 110 currently detect IR signals from the game controller 102 or 104. If this is the case, transmission is delayed until no more IR signals are detected for a predetermined minimum period of time, the Signal Free Time (SFT). In the situation as depicted in FIG. 1, the game controller 102 is transmitting control data to the game console 101. These control data are detected by the game controllers 103 and 104, which consequently postpone transmission of messages to the game console 101 themselves. Without any further measures, it would not be unlikely that game controllers 103 and 104 would start transmitting at the same instant, namely one SFT after the end of the message transmitted by the game controller 102. For that reason, a priority level is assigned to each game controller by the priority means 115, 116 and 117, respectively. Such a priority level is preferably encoded as an integer number ranging from one to the number of game controllers, a low number indicating a relatively high priority and a higher number indicating a relatively low priority. The priority of a game controller then determines the length of an extension of the delay time. For example, the delay time may be extended by a multiple of a fixed period of time, the multiple being given by the priority minus one, i.e., zero for the highest priority (one), one for the second highest priority (two), etc. Such a priority may be assigned manually by the user during a setup of the game controller.

When this priority principle is used, it is clear that the device with the lowest priority level will be in the position to block the medium. This is why an additional rule needs to be applied. If there are N different devices, each device has to wait N−1 (or at least N-priority) "turns" before it is allowed to send again after a successful transmission. A "turn" is the time needed for a complete transmission of a message, including the arbitration procedure.

Another possibility is the use of dynamic priorities, i.e., a device sets it own priority to the lowest level after a successful transmission, and increases its priority after an unsuccessful attempt.

In an alternative embodiment, no priority levels are assigned but the delay time is extended by a random period of time, which minimizes the chance that two game controllers start transmitting at the same moment.

Figure 2:
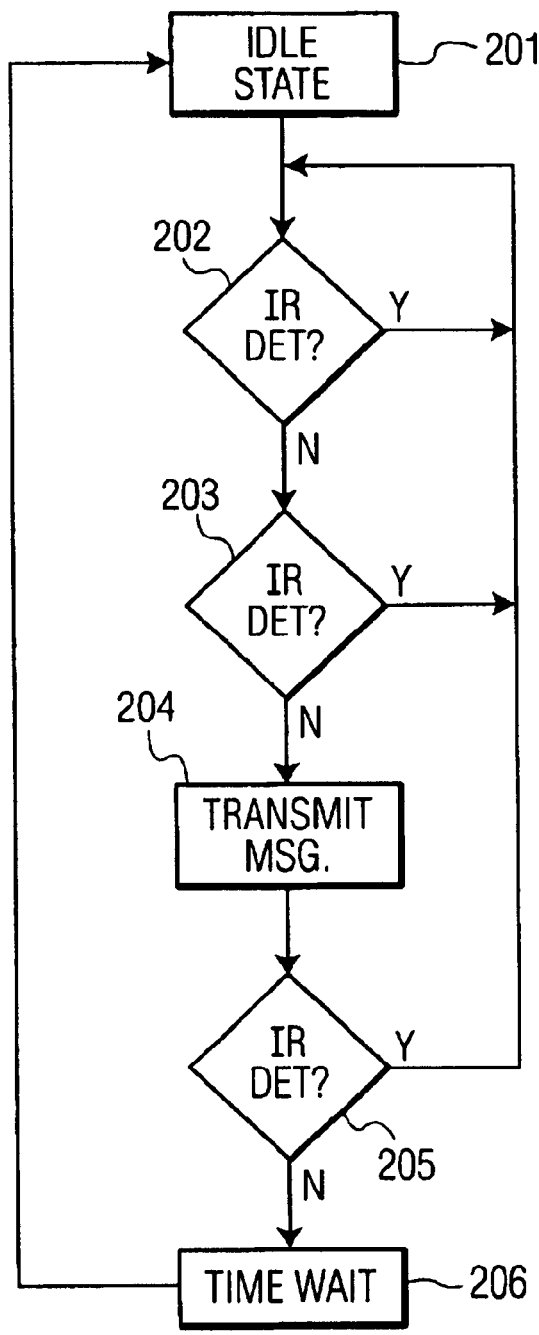
FIG. 2 shows a flowchart of the method according to the invention.

FIG. 2 shows a flowchart of the collision preventing method according to the invention. If after an idle state (step 201), a message has to be transmitted, the collision preventing means first check if there is any IR activity during a full Signal Free Time in a step 202. During this SFT, no IR pulse longer than a predetermined length, e.g., 81 microseconds, should appear. If such a pulse, i.e., IR activity, is detected, the device must wait for another SFT. If there is no activity, the device checks for IR activity for a random number of times between, for example, 1 and 16 in a step 203. In an alternative embodiment, this additional period is not random but determined by a priority of the device as explained hereinbefore. Only if no IR activity was detected during the additional random period, the message is sent in a step 204. After transmission of the message, the device checks, in a step 205, if the medium is free again. If this is not so, this indicates that another device has started sending without observing the required signal free time. In that case, the message is probably corrupted, and must be re-sent. After a successful transmission, the device waits for a certain time in a step 206, to allow other remote controls to transmit a message. This waiting time may correspond to the supported maximum number of remote controls, or may be configured in dependence on the actual number of remote controls used. After said waiting time, the remote control returns to the idle state 201.

Figure 3:
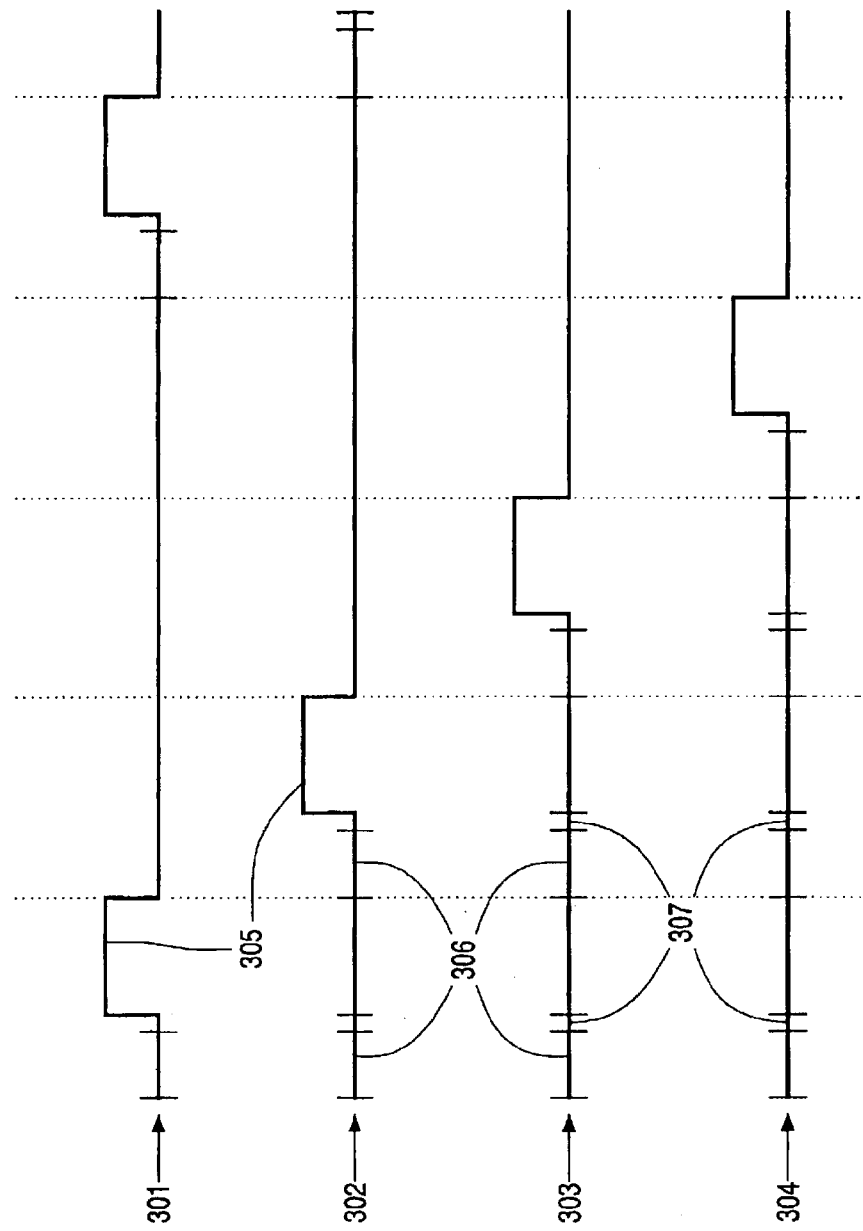
FIG. 3 visualizes the effect of the method according to the invention in a system with four remote controls.

FIG. 3 visualizes the effect of the collision preventing method according to the invention in a system with four remote controls. It shows transmission activities 301, 302, 303 and 304 as a function of time, each for a specific remote control. Each function has two levels. A high level indicates transmission of control data during a fixed transmission time 305. A low level indicates no transmission. Other fixed periods of time are the Signal Free Time 306, and the maximum random time 307. Suitable values for said time periods are: 12.2 milliseconds for the transmission time 305, 1 millisecond for the SFT 306, and 160 microseconds for the maximum random time 307. However, other values are possible as well and depend on the constraints of the application at hand. Initially, all four remote controls check whether the medium is free during the SFT 306. Subsequently, they all check the same for a random period smaller than or equal to the maximum random time 307. In FIG. 3, the first remote control starts a transmission while the other remote controls are still checking the medium and hence detect the signals from the first one and delay their own transmission accordingly. After the successful transmission, the first remote control is not allowed to transmit data for a relatively long period, so as to allow the other remote controls to transmit their messages. The other remote controls wait until the medium is free for the SFT 306 and for an additional random time period smaller than or equal to the maximum random time 307. Now, the second remote control starts transmitting while the others sense this IR activity and delay their own transmission again. This process is repeated until all remote controls have transmitted their messages and the whole cycle starts again. For each remote control, the theoretical maximum repeat time for performing another successful transmission is equal to four times the sum of the SFT, the transmission time and the maximum random time, which, for the values mentioned above, is 53.44 milliseconds. A shorter repeat time results if one or more of the four remote controls are not currently operated.

In summary, the invention relates to a system comprising an apparatus and a plurality of remote controls. Each remote control is equipped with a detector for detecting infrared signals from the other remote controls. The remote controls are capable of controlling the transmission of messages in dependence on a detection of signals from the other remote controls. In this way, collision between signals from different remote controls is prevented.

Although the invention has been described with reference to particular illustrative embodiments, variants and modifications are possible within the scope of the inventive concept. Thus, for example, the detection means may be a normal IR receiver built into the remote control. In addition to merely detecting signals from other remote controls, actually receiving and decoding the detected signals may give additional advantages. For example, a remote control may be able to identify the remote control which is currently transmitting, or what kind of message is currently transmitted. The remote control may adapt its own priority or other behavior in dependence on such decoded information.

It is, of course, a matter of interpretation whether a fixed Signal Free Time is incremented with a certain period, or whether the waiting time as a whole has a random length or is dependent on a priority level. In principle, the SFT may approximately zero, e.g., just long enough to detect IR activity once. Both interpretations thus fall within the scope of the present invention.

The use of the verb 'to comprise' and its conjugations does not exclude the presence of any elements or steps other than those defined in a claim. The invention can be implemented by means of hardware comprising several distinct elements, and by means of a suitably programmed computer. In claims in which several means are defined, several of these means can be embodied by one and the same item of hardware.

What is claimed is:

1. A system including an apparatus and at least one remote control, said remote control comprising:
   a transmitter for transmitting control data to the apparatus; and
   collision preventing means for preventing collision between said control data and further control data transmitted by a further remote control, characterized in that the remote control further comprises;
   detection means for detecting said further control data, the collision preventing means controlling the transmission of the control data in dependence on a detection by the detection means of the further control data.

2. The system as claimed in claim 1, characterized in that the collision preventing means delays transmission of the control data until said detection means does not detect further control data for a predetermined delay period.

3. The system as claimed in claim 2, characterized in that the collision preventing means extends the delay period by a random period of time.

4. The system as claimed in claim 2, characterized in that the remote control further comprises:

priority means for assigning a priority to the remote control relative to further remote controls, the collision preventing means extending the delay period by a period of time having a length dependent on said priority.

5. The system as claimed in claim 4, characterized in that the priority means lowers the priority relative to the further remote controls after a transmission.

6. The system as claimed in any one of claims 1 to 5, characterized in that the collision preventing means retransmits the control data if the detection means detects the further control data within a predetermined period of time after a first transmission of the control data.

7. The system as claimed in claim characterized in that the transmission of the control data involves on-off keying, wherein the detection means detects the further control data during 'off' periods, and the collision preventing means aborts the transmission of the control data upon such detection of the further control data, and retransmits the control data at a later instant.

8. The system as claimed in claim 1, wherein said system includes a television receiver.

9. The system claimed in claim 1, wherein said system comprises a computer system.

10. A remote control comprising:
a transmitter for transmitting control data to an apparatus; and
collision preventing means for preventing collision between said control data and further control data transmitted by a further remote control, characterized in that the remote control further comprises:
detection means for detecting said further control data, the collision preventing means controlling the transmission of the control data in dependence on the detection of the further control data by the detection means.

11. A method of transmitting control data from a remote control to an apparatus, comprising the step of:
preventing collision between said control data and further control data transmitted by a further remote control, characterized in that the method further comprises the step of:
detecting said further control data, wherein the step of preventing collision comprises controlling the transmission of the control data in dependence on the detection of the further control data.

12. The method as claimed in claim 11, characterized in that the method further comprises Bathe step of:
delaying the transmission of the control data until no further control data have been detected for a predetermined delay period.

13. The method as claimed in claim 12, characterized in that the method further comprises the step of:
extending the delay period by a random period of time.

14. The method as claimed in claim 12, characterized in that the method further comprises the steps of:
assigning a priority to the remote control relative to further remote controls;
extending the delay period by a period of time whose length is dependent on said priority.

15. The method as claimed in claim 14, characterized in that the method further comprises the step of:
lowering the priority relative to the further remote controls after a transmission.

16. The method as claimed in any one of claims 11 to 15, characterized in that the method further comprises the step of:
retransmitting the control data if the further control are detected within a predetermined period of time after a first transmission of the control data.

17. The method as claimed in claim 11, characterized in that the transmission of the control data involves on-off keying, wherein the method further comprises the steps of:
detecting the further control data during 'off' periods;
aborting the transmission of the control data upon such detection of the further control data; and
retransmitting the control data at a later instant.

* * * * *